United States Patent [19]

Bell et al.

[11] 4,167,881
[45] Sep. 18, 1979

[54] AIR PISTON DIFFERENTIAL LOCKOUT

[75] Inventors: Dale K. Bell, Ortonville; Floyd G. Saxton, Rochester, both of Mich.

[73] Assignee: Rockwell International Corporation, Pittsburgh, Pa.

[21] Appl. No.: 841,222

[22] Filed: Oct. 11, 1977

Related U.S. Application Data

[63] Continuation of Ser. No. 686,187, May 13, 1976, abandoned.

[51] Int. Cl.$^2$ ............................................. F16H 1/44
[52] U.S. Cl. ................................................... 74/710.5
[58] Field of Search ............................... 74/710.5, 711

[56] References Cited

U.S. PATENT DOCUMENTS

| 2,803,149 | 8/1957 | Pringle | 74/710.5 |
| 3,973,450 | 8/1976 | Shealy | 74/710.5 |

FOREIGN PATENT DOCUMENTS

| 1954534 | 6/1970 | Fed. Rep. of Germany | 74/711 |
| 169830 | 12/1959 | Sweden | 74/710.5 |

Primary Examiner—C. J. Husar
Assistant Examiner—Frank H. McKenzie, Jr.

[57] ABSTRACT

An axle assembly comprising a differential having a housing, an input drive pinion rotatably mounted in the housing and in driving meshing engagement with a drive gear rotatably mounted in the housing, the drive gear carrying a differential spider having rotatably thereon four differential pinions, a differential casing attached to the drive gear enclosing the differential spider and the differential pinions, a differential side gear also enclosed within the differential casing and in meshing engagement with the differential pinions, the internal bore of which is splined to accept an axle shaft through an opening in the differential casing, a cylindrical piston surrounding the axle shaft and splined thereto, the differential casing having a splined extension thereon to receive a comparably splined portion on the piston, biasing means biasing the piston along the longitudinal axis of the axle shaft to disengage the piston from the differential casing at their mating splined areas, a cylindrical cylinder surrounding the piston to provide an airtight chamber for compressed air acting on the piston within the airtight chamber to drive the piston in splined engagement with the splined portion of the differential casing to bypass and lockout the differential action of the differential pinions on the spider.

1 Claim, 1 Drawing Figure

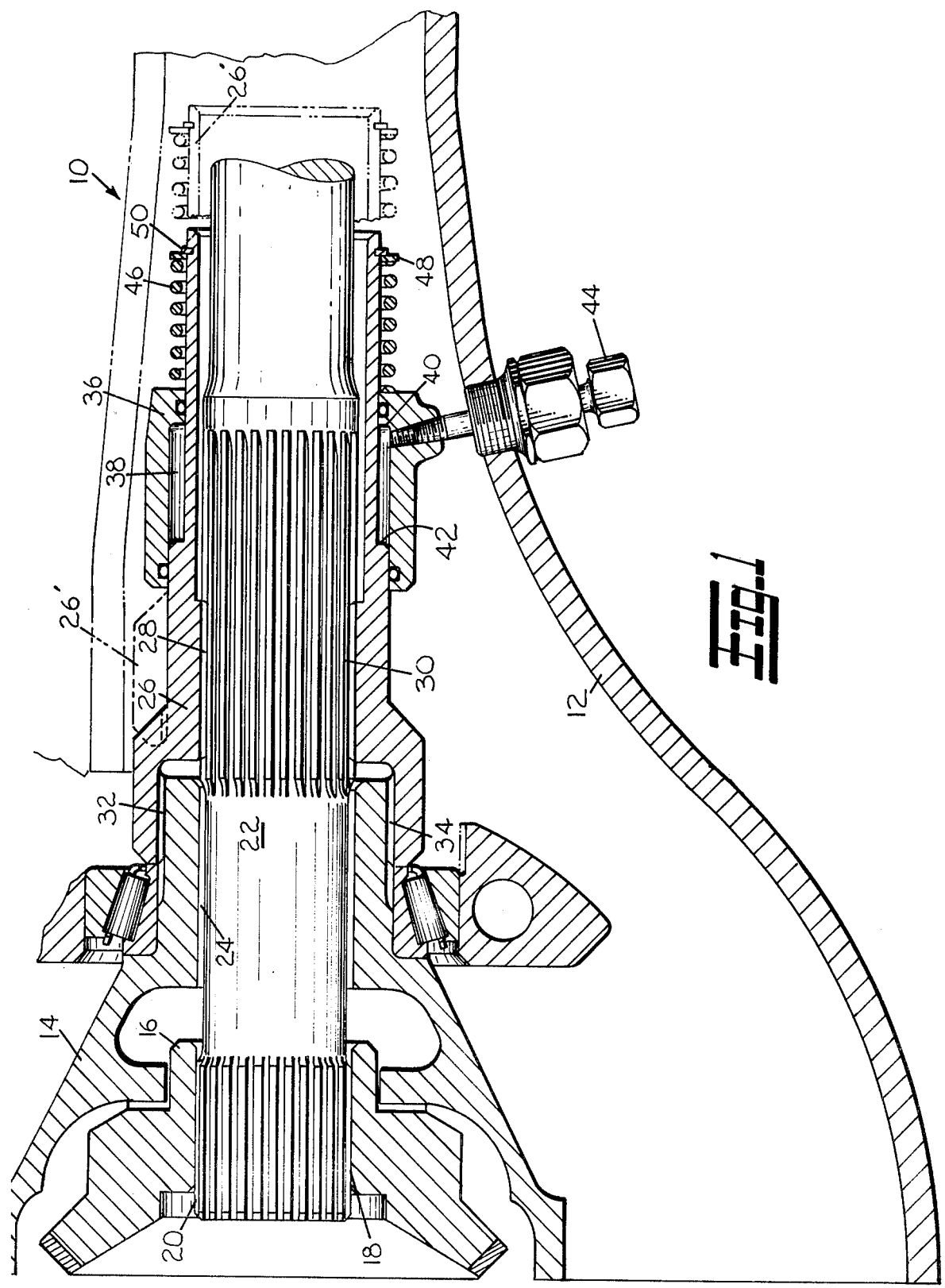

AIR PISTON DIFFERENTIAL LOCKOUT

This is a continuation of application Ser. No. 686,187, filed May 13, 1976, now abandoned.

BACKGROUND OF THE INVENTION

1. Field of the Invention

This invention relates generally to an axle assembly and, more particularly, an axle assembly having a differential with a differential lockout mechanism.

2. Description of the Prior Art

Truck differential mechanisms and the like are found in various types of axle assemblies and may come equipped with or without means to bypass or lockout the differential action of the differential. Many trucks in use today are equipped with automatic lockout mechanisms which allows for the transfer of power to one of the wheels when the other is slipping as on an icy pavement. A typical example of a no-slip type of differential is found in U.S. Pat. No. 3,390,593 entitled "Traction Equalizer", patented on July 2, 1968. As before noted, this latter mentioned patented differential contains an automatic differential lockout feature. There are situations when it is desirable to provide the operator of the vehicle with selective lockout means which can be energized by suitable control means provided in the cab.

The typical prior art approach to providing a differential lockout mechanism is to provide an air pneumatic cylinder external of the differential housing to engage and disengage certain operational parts of the differential. These prior art forms of lockout have been generally satisfactory, they are, however, in an exposed position with respect to the differential and axle housing. In such a position, they are not only exposed to the elements but also to flying projectiles that may be encountered on the road.

SUMMARY OF THE INVENTION

It is, therefore, a primary object of the present invention to provide an axle assembly comprising a differential having a housing, an input drive pinion rotatably mounted in the housing and in driving meshing engagement with a drive gear rotatably mounted in the housing, the drive gear carrying a differential spider having rotatably thereon four differential pinions, a differential casing attached to said drive gear enclosing the differential spider and the differential pinions, a differential side gear also is enclosed within said differential casing and is in meshing engagement with the differential pinions, the internal bore of which is splined to accept an axle shaft through an opening in the differential casing, the improvement comprising a cylindrical piston surrounding the axle shaft and splined thereto, the differential casing having a splined extension thereon to receive a comparably splined portion on the piston, biasing means biasing the piston along the longitudinal axis of the axle shaft to disengage the piston from the differential casing at their mating splined areas, a cylindrical cylinder surrounding the piston to provide an airtight chamber for compressed air received from air compressing means, the compressed air acts on the piston within the airtight chamber to drive the piston in splined engagement with the splined portion of the differential casing to bypass and lockout the differential action of the differential pinions on the spider.

It is a further object of this invention to provide an axle assembly wherein the piston rotates with the axle shaft and the cylinder remains stationary with respect to the housing and the splined portion provided on the outer surface of the differential casing mating with the splined portion provided on the inner surface of the piston.

It is a still further object of the present invention to provide an axle assembly wherein at least one O-ring is provided between the surfaces of the piston and the cylinder and the cylinder provided with a threaded opening to receive a threaded fitting connected to the compressed air system of the vehicle with which it is associated.

It is also an object of this invention to provide an axle assembly wherein the biasing means is a spring surrounding the piston and is retained thereon by holding means, the spring contacting at one end the cylinder and at its other end the holding means.

It is another object of this invention to provide an axle assembly wherein there are two O-ring seals, one at each end of the cylinder and the cylinder being concentric with the piston and the axle shaft.

It is another object of the present invention to provide an axle assembly wherein the piston is normally biased out of contact with the differential casing by the biasing means, the compressed air being introduced into the chamber to overcome the biasing means to meshingly engage the piston with the differential casing and the compressed air being remotely controlled by valving means provided in the compressed air service system.

It is a still further object of the present invention to provide an axle assembly wherein the piston moves longitudinally in and is guided by the splines provided on the outer surface of the axle shaft.

It is also an object of the present invention to provide an axle assembly wherein the piston and the cylinder are totally enclosed within the housing assembly, an air fitting in communication with the air chamber provided in the cylinder, and the air fitting protruding through and outwardly of the housing.

It is still a further object of the present invention to provide an axle assembly wherein the piston is an elongated sleeve whose longitudinal axis is coincident with the longitudinal axis of the axle shaft, the elongated sleeve having a shoulder thereon whose radially extending surface provides the area against which the compressed air acts to drive the piston in splined engagement with the differential casing.

It is also an object of the present invention to provide an axle assembly wherein the elongated sleeve is provided with two coaxial splined surfaces, the inner of which is in engagement with the splined surface provided on the outer surface of the axle shaft and the outer of which is adapted to be in splined engagement with the splined portion provided on the outer surface of the differential casing.

It is another object of this invention to provide a differential lockout mechanism which is simplistic in design and inexpensive to manufacture.

It is yet another object of this invention to provide a differential lockout mechanism which is easy to maintain and reliable over a long period of time.

It is a still further object of this invention to provide a differential lockout mechanism which may be adapted to various types of differentials as, for example, multiple reduction and single reduction drive units.

These and other advantages of the present invention will become apparent as it is further described and explained in the following disclosure and as shown in the accompanying drawing.

DESCRIPTION OF THE DRAWING

FIG. 1 is a partial sectional view of the present invention, showing a portion of a differential including the differential lockout mechanism contemplated by this invention.

DETAILED DESCRIPTION OF THE PREFERRED EMBODIMENT

Referring now to the drawing, there is shown a portion of a single reduction drive unit. The drive unit 10 is particularly adapted to be assembled with an axle assembly and operably connected to a drive shaft, neither of which are shown.

The differential drive unit 10 is of the type found in Rockwell International "Field Maintenance Manual No. 5" dated March, 1975. Before proceeding further, however, it should be noted that the below-described invention is applicable to other forms of reduction drive units (differentials) and may be applied to multiple reduction drive units as well as single reduction drive units.

The differential drive unit 10 includes a housing 12 which encloses the various operational parts of the differential drive unit 10. The housing 12 may include a number of parts (not shown) which may be suitably fastened together to form the entire enclosure and, in general, to form an axle assembly. The differential drive unit 10 has a number of parts including, generally, an input drive pinion (not shown) which is rotatably mounted within the housing 12. The input drive pinion is connected either directly or through some intermediate means to the drive shaft or power train of the vehicle with which it is associated. The input drive pinion is in driving, meshing engagement with a drive gear (also not shown) which is also rotatably mounted in the housing 12. The drive gear typically carries a differential spider for mounting thereon four differential pinions. A differential casing 14 is provided in the differential drive unit 10 to enclose the differential pinions and maintain the operational position of the differential spider. The differential casing 14 is typically bolted to the above-mentioned drive gear. The differential drive unit 10 also is provided with two differential side gears 16, one of which is shown in FIG. 1. The differential side gear 16 is enclosed within the differential casing 14 and is provided with teeth which are in meshing engagement with the differential pinions and is driven thereby. The differential side gears 16 are provided with a splined central bore 18 and are to be adapted to accept a splined end of an axle shaft 22 through the opening 24 in the differential casing 14.

It may be generally stated at this juncture of the description of the present invention that the above-noted structure is generally in conformity with the prior art and the main thrust of the present invention is to provide a new and novel means to bypass the differential action of the differential drive unit 10 and that new and novel means is to be described below.

One component of this new and novel mechanism is the cylindrical piston 26 which, generally, surrounds the axle shaft 22. The cylindrical piston 26 has a longitudinal axis coincident with that of the axle shaft and is coaxial with the axle shaft 22. The cylindrical piston 26 is provided with several series of splines at different locations thereon. A first series of splines 28 are in engagement and interlock with complementary splines 30 provided on outer surface of the axle shaft intermediate its ends. The interlocked relationship of the splines 28 and 30 locks the piston 26 on a rotatable basis to the axle shaft 22, i.e., as the axle shaft 22 turns the piston 26 will turn with it. A second series of splines 32 is provided at one end of the piston 26 and are adapted to mesh with a complementary series of splines 34 provided on the outer surface of the differential casing 14. All of the series of splines 28, 32 and 34 are parallel with the longitudinal axis of the axle shaft 22, thereby, allowing the piston 26 to move longitudinally with respect to the axle shaft 22. The significance of this longitudinal motion of the piston 26 will be further explained below.

A cylindrical cylinder 36 is provided within the housing 12 surrounding the piston 26. The cylinder 36 is in airtight relationship with the piston 26 to define an air chamber 38. The top 40 of the air chamber 38 is defined by a radially extending portion of the cylinder 36, the portion being formed integrally with the cylinder 36. A shoulder 42 on the piston 26 defines the other end of the air chamber 38. The cylinder 36 is held in floating position by holding means (not shown) such that it may move slightly in a radial or lateral direction to accommodate for misalignment or or eccentricity of the axle shaft 22. An air fitting 44 connects the air chamber 38 with the service air of the vehicle with which the differential drive unit 10 is associated. The service air is used to provide the motive force for the brake system and other related accessory systems on the vehicle.

The piston 26 as shown by the solid lines in FIG. 1 is in engagement with the differential casing 14 and the axle shaft 22. The piston 26 is also shown in dotted form 26' and in that position is out of engagement with the differential casing 14; but still in engagement with the axle shaft 22. These are the two basic operational positions of the piston. The normal position being shown by piston 26'. The piston 26' is moved to the extended or disengaged position by biasing means thereon, particularly by helical spring 46 surrounding the piston 26 and held in place by holding means, such as ring 48 which abuts a snap ring 50. It can be seen, therefore, that the force of the spring is exerted on the top of the cylinder 36 and against the ring 48 to drive the piston to its disengaged position as denoted by 26'. The application of service air to the air chamber 38 through the air fitting 44 will overcome the biasing force of the spring 46 and drive the piston toward the differential casing 14 to engage the splined portions 32 and 34, respectively.

Obviously, while the piston is in its disengaged position, i.e., disengaged from the differential casing 14, the differential drive unit 10 and its various operational parts are again in a normal position, i.e., permitting wheels to rotate at different speeds. If one of the two wheels attached to the axle shafts operably connected to the differential drive unit 10 experiences a slipping condition and that wheel begins to spin, the operator may lockout the differential action of the differential drive unit 10 which is causing the spinning by charging the air chamber with service air. A suitable control valve or the like (not shown) may be provided in the vehicle cab readily accessible to the operator for this purpose. Once the chamber is charged with the service air the piston will be driven toward the differential casing 14 and the splined portions 32 and 34 will mesh and interlock. At this point power will be transmitted through the differential unit 10 to the axle shaft directly from the drive gear to the differential casing to axle shaft bypassing the action of the differential pinions on the differential side gear. This locking out of the differential pinions will result in power being transmitted to the wheels thereby effecting traction to move an otherwise immobilized vehicle, i.e. the locking out of the differential will result in both the wheels operating at the same speed. If the operator inadvertently leaves the locking out mechanism engaged, he will experience a change in the steering characteristics of the vehicle during cornering or other similar maneuvers because of the dragging of a wheel around such corner. This change in steering characteristic will be quickly sensed by the operator and he can appropriately deactivate the locking out mechanism. It can be seen, therefore, that the vehicle operator can selectively activate the piston to lockout the differential action of the differential drive unit 10. This feature has provided the vehicle operator with the above-described new and novel lockout mechanism, which is simplistic in design yet reliable in service and relatively impervious to the environment encountered externally of the housing 12.

The present invention is not to be limited to the specific details as hereberfore described but is capable of many other modifications and changes without departing from the spirit and scope of the appended claims.

We claim:

1. An axle assembly comprising: a differential, said differential having a housing, an input drive pinion rotatably mounted in said housing and in driving meshing engagement with a drive gear rotatably mounted in said housing, said drive gear carrying a differential spider having rotatably thereon four differential pinions, a differential casing attached to said drive gear enclosing said differential spider and said differential pinions, a differential side gear also enclosed within said differential casing and in meshing engagement with said differential pinions the internal bore of which is splined to accept an axle shaft through an opening in said differential casing, a cylindrical piston surrounding said axle shaft and splined thereto, said differential casing having a splined extension thereon to receive a comparably splined portion on said piston, biasing means biasing said piston along the longitudinal axis of said axle shaft to disengage said piston from said differential casing at their mating splined areas, a cylindrical cylinder surrounding said pinion to provide an airtight chamber for compressed air received from air compressing means, said compressed air acting on said piston within said airtight chamber to drive said piston in splined engagement with the splined portion of said differential casing to bypass and lockout the differential action of said differential pinions on said spider, said piston rotates with said axle shaft and a clearance is provided therebetween to allow said piston to move axially and radically thereto, said splined portion being provided on the outer surface of said differential casing mating with the splined portion provided on the inner surface of said piston, at least one O-ring seal is provided between the surfaces of said piston and said cylinder, said cylinder being provided with a threaded opening to receive a threaded fitting connected to the compressed air system of the vehicle with which it is associated, said biasing means is a spring surrounding said piston and retained thereon by holding means, spring contacting at one end said cylinder and at its other end said spring holding means, there are two O-ring seals, one at each end of said cylinder and said cylinder is concentric with said piston and said axle shaft, said piston is normally biased out of contact with said differential casing by said biasing means, said compressed air being being introduced into said chamber to overcome said biasing means to meshingly engage said piston with said differential casing, said compressed air being remotely controlled by valving means provided in said compressed air service system, said piston moves longitudinally in and is guided by the splines provided on the outer surface of said axle shaft, said piston and said cylinder are totally enclosed within said housing assembly, an air fitting in communication with said air chamber provided in said cylinder, said air fitting protruding through and outwardly of said housing, said piston is an elongated sleeve whose longitudinal axis is coincident with the longitudinal axis of said axle shaft, said elongated sleeve having a shoulder thereon whose radially extending surface provides the area against which the compressed air acts to drive said piston in splined engagement with said differential casing, said elongated sleeve is provided with two coaxial splined surfaces, the inner of which is in engagement with the splined surface provided on the outer surface of said axle shaft, the outer of which is adapted to be in splined engagement with the splined portion provided on the outer surface of said differential casing.

* * * * *